(12) United States Patent
Lewandowski et al.

(10) Patent No.: US 9,593,230 B2
(45) Date of Patent: Mar. 14, 2017

(54) PLASTICIZED POLYMERIC COMPOSITION

(71) Applicant: 3M INNOVATIVE PROPERTIES COMPANY, St. Paul, MN (US)

(72) Inventors: Kevin M. Lewandowski, Inver Grove Heights, MN (US); Jonathan E. Janoski, Woodbury, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

(21) Appl. No.: 15/025,745

(22) PCT Filed: Oct. 20, 2014

(86) PCT No.: PCT/US2014/061356
§ 371 (c)(1),
(2) Date: Mar. 29, 2016

(87) PCT Pub. No.: WO2015/065748
PCT Pub. Date: May 7, 2015

(65) Prior Publication Data
US 2016/0257802 A1    Sep. 8, 2016

Related U.S. Application Data

(60) Provisional application No. 61/898,587, filed on Nov. 1, 2013.

(51) Int. Cl.
| | | |
|---|---|---|
| *C08K 5/10* | (2006.01) | |
| *C08K 5/103* | (2006.01) | |
| *C08F 220/10* | (2006.01) | |
| *C09J 4/06* | (2006.01) | |
| *C09J 133/08* | (2006.01) | |
| *C08L 1/10* | (2006.01) | |
| *C08L 1/12* | (2006.01) | |
| *C08L 33/08* | (2006.01) | |
| *C08L 67/00* | (2006.01) | |
| *C08L 67/04* | (2006.01) | |
| *C09D 101/10* | (2006.01) | |
| *C09D 101/12* | (2006.01) | |

(52) U.S. Cl.
CPC ............ *C08K 5/103* (2013.01); *C08F 220/10* (2013.01); *C08L 1/10* (2013.01); *C08L 1/12* (2013.01); *C08L 33/08* (2013.01); *C08L 67/00* (2013.01); *C08L 67/04* (2013.01); *C09D 101/10* (2013.01); *C09D 101/12* (2013.01); *C09J 4/06* (2013.01); *C09J 133/08* (2013.01)

(58) Field of Classification Search
CPC ...................................................... C08K 5/103
USPC ......................................................... 524/315
See application file for complete search history.

(56) References Cited

U.S. PATENT DOCUMENTS 2,476,976 A * 7/1949 Grunfeld ................ C08K 5/103
106/169.39

FOREIGN PATENT DOCUMENTS

| GB | 858176 | 1/1961 |
| WO | 2013/148255 | 10/2013 |

OTHER PUBLICATIONS

Brown, "Plasticizers from Tetrahydrofurfuryl Alcohol", Journal of Chemical and Engineering Data, Jan. 1960, vol. 5, No. 1, pp. 56-58.
Grummitt, "1,2,5-Trihydroxypentane", Org. Syn. Coll., 1955, vol. 3, pp. 833-835.
Hoydonckx, "Furfural and Derivatives", Ullmann's Encyclopedia of Industrial Chemistry, 2012, vol. 16, pp. 285-313.
Tanoue, "Ring Opening of Cyclic Ethers by Sulfuric Acid—Acetic Anhydride", Journal of Heterocyclic Chemistry, Sep./Oct. 2000, vol. 37, No. 5, pp. 1351-1353.
Wilson, "15. Reactions of Furan Compounds. Part II. Fission of the Tetrahydrofuran and the Tetrahydropyran Ring", Journal of the Chemical Society (Resumed), Jan. 1, 1945, pp. 48-51.
International Search Report for PCT International Application No. PCT/US2014/061356, mailed on Dec. 17, 2014, 3 pages.

\* cited by examiner

*Primary Examiner* — Hui Chin
(74) *Attorney, Agent, or Firm* — Jean A. Lown

(57) ABSTRACT

Polymeric compositions are provided that include a 1,2,5-pentanetriol trialkylester plasticizer. The plasticizer has low odor, has good compatibility with a variety of polymers such as hydrophilic polymeric materials, and can be formed from renewable resources. Further, the plasticizer can be used at temperatures often encountered during hot melt processing of polymeric compositions.

20 Claims, No Drawings

PLASTICIZED POLYMERIC COMPOSITION

CROSS REFERENCE TO RELATED APPLICATION

This application is a national stage filing under 35 U.S.C. 371 of PCT/US2014/061356, filed Oct. 20, 2014, which claims the benefit of U.S. Provisional Application No. 61/898,587, filed Nov. 1, 2013, the disclosures of which are incorporated by reference in their entireties herein.

TECHNICAL FIELD

Polymeric compositions that include a 1,2,5-pentanetriol trialkylester plasticizer and articles that include the polymeric compositions are provided.

BACKGROUND

Various ester compounds have been used as plasticizers in polymeric compositions. These plasticizers include, for example, alkyl phthalates and adipate esters. In recent years, various plasticizers based on renewable materials have been introduced. These include those based on citric acid (e.g., from Vertellus), succinic acid (e.g., from BioAmber and Myriant), vegetable oil (e.g., from Danisco and Dow Chemical Co.), isosorbide (e.g., from Roquette), and levulinic acid (e.g., from Segetis). Most of these renewable materials are compatible with polyvinyl chloride but may not be suitable for use with more hydrophilic polymers.

SUMMARY

Polymeric compositions are provided that include a 1,2,5-pentanetriol trialkylester plasticizer. The plasticizer has low odor, has good compatibility with a variety of polymeric materials, and can be formed from renewable resources. Further, the plasticizer can be used at temperatures often encountered during hot melt processing of polymeric compositions.

In a first aspect, a polymeric composition is provided that includes a) a plasticizer and b) a polymeric material, wherein the plasticizer is compatible with the polymeric material. The plasticizer is a compound of Formula (I).

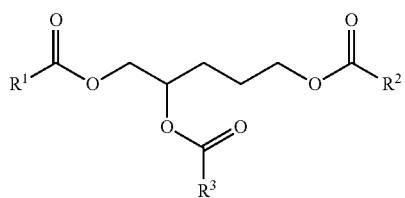

In Formula (I), each $R^1$, $R^2$, and $R^3$ independently is an alkyl group with at least two of $R^1$, $R^2$, and $R^3$ alkyl groups having more than one carbon atom.

In a second aspect, an article is provided that includes a polymeric composition. The polymeric composition is the same as described above.

DETAILED DESCRIPTION

Polymeric compositions are provided that include a polymeric material plus a 1,2,5-pentanetriol trialkylester. The 1,2,5-pentanetriol trialkylester can function as a plasticizer for various compatible polymeric materials such as hydrophilic polymeric materials.

The terms "a", "an", "the", "at least one", and "one or more" are used interchangeably.

The term "and/or" means one or both such as the expression A and/or B refers to A alone, B alone, or both A and B.

The terms "polymeric material" and "polymer" are used interchangeably and can refer to a homopolymer, copolymer, terpolymer, and the like.

The term "alky" refers to a monovalent radical of an alkane. Suitable alkyl groups can have up to 12 carbon atoms, up to 10 carbon atoms, up to 6 carbon atoms, up to 4 carbon atoms, or up to 3 carbon atoms. The alkyl group can be linear, cyclic, or branched.

In a first aspect, a polymeric composition is provided that includes a) a plasticizer and b) a polymeric material, wherein the plasticizer is compatible with the polymeric material. The plasticizer is a compound of Formula (I).

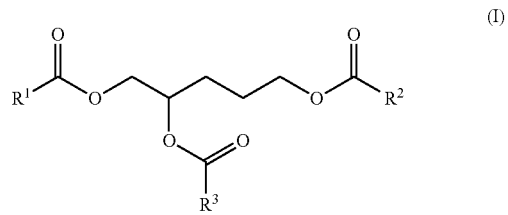

In Formula (I), each $R^1$, $R^2$, and $R^3$ independently is an alkyl group, wherein at least two of $R^1$, $R^2$, and $R^3$ alkyl groups having more than one carbon atom. The compound of Formula (I) is typically a liquid (e.g., oil) at room temperature (e.g., about 20° C. to about 25° C.).

Each alkyl $R^1$, $R^2$, and $R^3$ group in Formula (I) can have any suitable number of carbon atoms provided that the compound of Formula (I) is not crystalline and provided that no more than one of $R^1$, $R^2$, and $R^3$ is methyl. A non-crystalline compound of Formula (I) can often have alkyl groups containing up to 12 carbon atoms if the alkyl groups are linear or can have alkyl groups containing more than 12 carbon atoms if the alkyl groups are branched or cyclic (or contain a cyclic portion). Often, each $R^1$, $R^2$, and $R^3$ alkyl group has up to 12 carbon atoms, up to 11 carbon atoms, up to 10 carbon atoms, up to 6 carbon atoms, up to 5 carbon atoms, or up to 4 carbon atoms. Because no more than one of $R^1$, $R^2$, and $R^3$ can be methyl, at least two of $R^1$, $R^2$, and $R^3$ often have 2 to 12 carbon atoms, 2 to 11 carbon atoms, 2 to 10 carbon atoms, 2 to 8 carbon atoms, 2 to 6 carbon atoms, or 2 to 4 carbon atoms and one of $R^1$, $R^2$, and $R^3$ can have 1 to 12 carbon atoms, 1 to 11 carbon atoms, 1 to 10 carbon atoms, 1 to 6 carbon atoms, or 1 to 4 carbon atoms.

The compounds of Formula (I) have a higher molecular weight than 1,2,5-pentanetriol trimethylester. Although the compound 1,2,5-pentanetriol trimethylester (1,2,5-triacetoxypentane) may function well as a plasticizer, it tends to be volatile. Plasticizers having a lower volatility than 1,2,5-pentanetriol trimethylester are usually desired because they have an associated lower odor. In some polymeric compositions, a small amount of 1,2,5-pentanetriol trimethylester can be used in combination with the compound of Formula (I).

In some embodiments, the polymeric composition includes both a compound of Formula (I) plus one or more optional compounds of Formula (II).

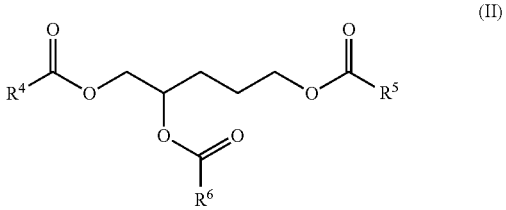

The compound of Formula (II) is different than the compound of Formula (I) and each $R^4$, $R^5$, and $R^6$ is an alkyl with at least two of the $R^4$, $R^5$, and $R^6$ alkyl groups being methyl. Like the compound of Formula (I), the compound of Formula (I) is not crystalline and is often a liquid (e.g., oil) at room temperature. The compound of Formula (II) can have all three $R^4$, $R^5$, and $R^6$ groups equal to methyl (i.e., the compound of Formula (II) is 1,2,5-pentanetriol trimethylester. Alternatively, two of the $R^4$, $R^5$, and $R^6$ groups are methyl and one of the $R^4$, $R^5$, and $R^6$ is an alkyl groups has at least 2 carbon atoms. This alkyl group typically has 2 to 12 carbon atoms if the alkyl group is linear or 2 to greater than 12 carbon atoms is the alkyl group is branched or cyclic (or contain a cyclic portion). Thus, two of the three $R^4$, $R^5$, and $R^6$ alkyl groups is methyl and one of the three $R^4$, $R^5$, and $R^6$ alkyl groups often has 1 to 12 carbon atoms, 1 to 11 carbon atoms, 1 to 10 carbon atoms, 1 to 6 carbon atoms, or 1 to 4 carbon atoms.

The compounds of Formula (I) and (II) can be prepared using a one step reaction from commercially available tetrahydrofurfuryl alcohol, and alkyl anhydride, and a catalyst such as zinc chloride. This reaction is shown in Reaction Scheme A.

Reaction Scheme A

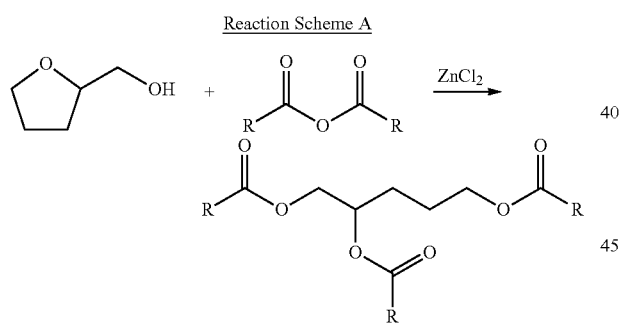

Tetrahydrofurfuryl alcohol is reacted with an anhydride. Each R group is an alkyl. The product is typically isolated directly from the reaction mixture by distillation. The percent yield is typically greater than about 80 percent.

Alternatively, the compounds of Formula (I) and (II) can be prepared by a three step procedure. In the first step, tetrahydrofurfuryl alcohol is reacted with acetic anhydride to prepare 1,2,5-pentanetriol triacetate (as in Reaction Scheme A). This compound can then be hydrolyzed to 1,2,5-petanetriol. The 1,2,5-petanetriol can be further reacted with an alkyl carboxylic acid, alkyl anhydride, or alkyl carboxylic halide to prepare the corresponding 1,2,5-pentanetriol tri-alkylester. This three step method is particularly advantageous when the desired alkyl anhydride for Reaction Scheme A is not readily available.

Both of these methods of preparing the compounds of Formula (I) and (II) are based on the use of the tetrahydrofurfuryl alcohol, which can be a renewable material. More specifically, tetrahydrofurfuryl alcohol can be formed from C5 sugars (i.e., sugars having 5 carbon atoms). The C5 sugars can be dehydrated to furfural (i.e., 2-furaldehyde or furfuraldehyde), which can be hydrogenated to furfuryl alcohol. Furfuryl alcohol can be further hydrogenated with a nickel catalyst to tetrahydrofurfuryl alcohol. Methods of preparing tetrahydrofurfuryl alcohol are further described in the reference Hoydonckx et al., Furfural and Derivatives, *Ullmann*'s Encyclopedia of Industrial Chemistry, Wiley-VCH Verlag GmbH & Co., pp. 285-313 (2012).

If a single anhydride is used in Reaction Scheme A, all of alkyl groups (R groups) of the 1,2,5-pentanetriol trialkylester will be the same. If a mixture of anhydride compounds are used, however, a mixture of 1,2,5-pentanetriol trialkyl ester compounds will be formed. For example, if a mixture of two different anhydrides of formulas

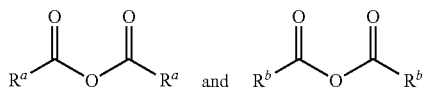

is used, the reaction with tetrahydrofurfuryl alcohol results in a mixture of compounds of Formula (I) (or a mixture of compounds of Formula (I) and Formula (II)) will result. This mixture will include compounds

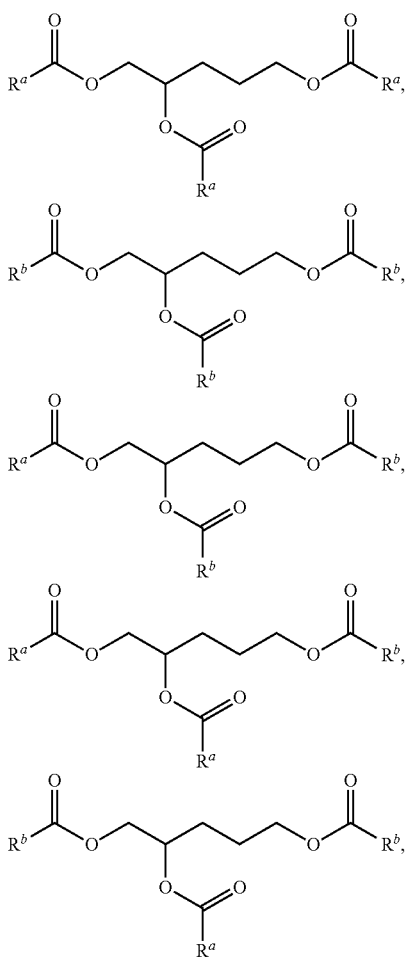

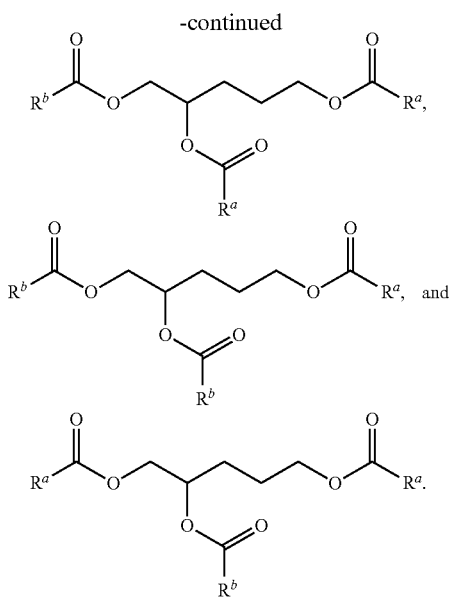

The groups $R^a$ and $R^b$ are alkyl groups having, for example, 1 to 12 carbon atoms.

In a specific example, if a mixture of acetic anhydride and proprionic anhydride are used, the product will include a mixture of 1,2,5-pentane triol triacetate, 1,2,5-pentane triol diacetate monopropionate, 1,2,5-pentane triol monoacetate dipropionate, and 1,2,5-pentane triol tripropionate.

If acetic anhydride is included in a mixture of anhydrides, the relative amounts of acetic anhydride and the other anhydride are selected to minimize the amount of compounds of Formula (II). In particular, the amount of 1,2,5-pentane triol triacetate (the compound of Formula (II) where each $R^4$, $R^5$, and $R^6$ is methyl) is minimized. For example, if acetic anhydride is included in the mixture of anhydrides, the amount of acetic anhydride is selected so that no greater than 15 weight percent, no greater than 12 weight percent, no greater than 10 weight percent, no greater than 8 weight percent, no greater than 6 weight percent, no greater than 4 weight percent, or no greater than 2 weight percent of the total combined weight of the compounds of Formula (I) and Formula (II) is 1,2,5-pentane triol triacetate.

In some embodiments, if acetic anhydride is included in the mixture of anhydrides, the amount of Formula (II) with at least two of $R^4$, $R^5$, and $R^6$ being methyl is minimized. For example, the amount of acetic anhydride is selected so that no greater than 25 weight percent, no greater than 20 weight percent, no greater than 15 weight percent, no greater than 10 weight percent, or no greater than 5 weight percent of the total combined weight of the compounds of Formula (I) and Formula (II) is a compound of Formula (II) with at least two of $R^4$, $R^5$, and $R^6$ being methyl.

The compound of Formula (I) (or optionally further with the compound of Formula (II)) can be combined with a compatible polymeric material to provide a polymeric composition. As used herein, the term "compatible" refers to a polymeric material that is miscible with the compound of Formula (I) (or optionally further with the compound of Formula (II)). That is, the compound of Formula (I) (or optionally further the compound of Formula (II)) is soluble in the polymeric material; a mixture of the polymeric material and the compound of Formula (I) (or optionally the compounds of both Formula (I) and Formula (II)) is a single phase. Compatibility can be determined, for example, by measuring the haze of a film prepared from a mixture of the polymeric material with the compound of Formula (I) (or optionally further with the compound of Formula (II)). One suitable method of measuring haze is described in Example section (Measurement of Haze). A low haze value (e.g., less than 5, less than 4, less than 3, less than 2, or even less than 1) is typically associated with a mixture having compatible components.

Many polymeric materials are compatible with the compounds of Formula (I). The polymeric material can be hydrophilic. Example polymeric materials include various thermoplastic polymers such as various aliphatic polyesters (e.g., polylactic acid), cellulose esters, polyvinyl chloride, and various acrylic polymers such as poly(methyl methacrylate). Other example polymeric materials include various elastomeric polymers such as those included in adhesive compositions. The elastomeric polymers are often acrylic polymers such as polymers formed using at least one alkyl (meth)acrylate monomer and optionally a polar monomer such as (meth)acrylic acid.

The aliphatic polyesters can be formed by dehydration-polycondensation reactions of one or more aliphatic hydroxycarboxylic acids. Example hydroxycarboxylic acids include, but are not limited to, L-lactic acid, D-lactic acid, glycolic acid, 3-hydroxypropionic acid, 3-hydroxybutyric acid, 4-hydroxybutyric acid, 4-hydroxypentanoic acid, 3-hydroxypentanoic, 5-hydroxypentanoic acid, 3-hydroxyhexanoic acid, 6-hydroxyhexanoic acid, 3-hydroxyheptanoic, 3-hydroxyoctanoic acid, or mixtures thereof.

Alternatively, the aliphatic polyesters can be formed by dehydration-polycondensation reactions of a mixture containing an aliphatic polycarboxylic acid (i.e., a compound having two or more carboxylic acid groups) and an aliphatic polyol (i.e., a compound having two or more hydroxyl groups). Examples of polycarboxylic acids include, but are not limited to, oxalic acid, succinic acid, malonic acid, glutaric acid, adipic acid, pimelic acid, suberic acid, azelaic acid, undecanedioic acid, dodecanedioic acid, and anhydrides thereof. Examples of polyols include, but are not limited to, ethylene glycol, diethylene glycol, triethylene glycol, polyethylene glycol, polypropylene glycol, 1,3-propanediol, 1,2-propanediol, dipropylene glycol, 1,2-butanediol, 1,3-butanediol, 1,4-butanediol, 3-methyl-1,5-pentanediol, 1,6-hexanediol, 1,9-nonanediol, neopentyl glycol, tetramethylene glycol and 1,4-cyclohexanedimethanol. Suitable polycarboxylic acids often have two carboxylic acid group and suitable polyols often have two hydroxyl groups.

The aliphatic polyester can be a polylactic acid based resin (PLA-based resin). Some example PLA-based resins can be formed from L-lactic acid, D-lactic acid, or a mixture thereof. Other example PLA-based resins can be prepared from L-lactic acid, D-lactic acid, or a mixture thereof in combination with at least one aliphatic hydroxycarboxylic acid (other than lactic acid). Yet other PLA-based resins are copolymers prepared from L-lactide, D-lactide, or a mixture thereof. The lactides are cyclic dimers of lactic acid that can be subjected to a ring-opening polymerization reaction in the presence of a compound having a hydroxyl group such as a hydroxycarboxylic acid. Example hydroxycarboxylic acids are the same as those listed above. In one more specific example, the PLA-based resin is a copolymer of (1) L-lactic acid, D-lactic acid, or a mixture thereof plus (2) glycolic acid.

Other example PLA-based resins can prepared using a combination of (1) a lactic acid (e.g., D-lactic acid, L-lactic acid, or a mixture thereof), (2) an aliphatic polycarboxylic acid (i.e., a compound having at least two carboxylic acid groups), and (3) an aliphatic polyol (i.e., a compound having at least two hydroxyl groups). Yet other PLA-based resins can be prepared using a combination of (1) a lactide (e.g., D-lactide, L-lactide, or a mixture thereof), (2) an aliphatic polycarboxylic acid, and (3) an aliphatic polyol. Suitable polycarboxylic acids and polyols are the same as listed above.

PLA-based resins often contain lactic acid units (i.e., the residue of the lactic acid present in the polymeric material) and other optional units such as hydroxycarboxylic acid units (i.e., the residue of the hydroxycarboxylic acid present in the polymeric material), polycarboxylic acid units (i.e., the residue of the polycarboxylic acid present in the polymeric material), and polyol units (i.e., the residue of the polyol present in the polymeric material). These PLA-based resins often contain at least 50 weight percent lactic acid units. For example, the PLA-based resins can contain at least 60 weight percent, at least 70 weight percent, at least 80 weight percent, at least 90 weight percent, at least 95 weight percent, or at least 98 weight percent lactic acid units.

Suitable PLA-based resins are commercially available under the trade designation INGEO (e.g., INGEO 4032D, INGEO 4043D, and INGEO 4060D) from NatureWorks, LLC (Minnetonka, Minn., USA).

The PLA-based resin can be used as the only polymeric material in the composition or can be combined with another polymeric material such as another polyester resin, a polyolefin (e.g., polyethylene, polypropylene, or copolymers thereof), or the like. In many embodiments, at least 50 weight percent of the polymeric material is a PLA-based resin. For example, the polymeric material can include 50 to 95 weight percent PLA-based resin and 5 to 50 weight percent of another polyester and/or polyolefin, 60 to 95 weight percent PLA-based resin and 5 to 40 weight percent of another polyester and/or polyolefin, or 75 to 95 weight percent PLA-based resin and 5 to 25 weight percent of another polyester and/or polyolefin.

In other embodiments, the polymeric material is a cellulose ester (i.e., a reaction product of cellulose and a carboxylic acid). Example cellulose esters include cellulose acetate, cellulose triacetate, cellulose propionate, cellulose acetate propionate, cellulose tripropionate, cellulose butyrate, cellulose tributryrate, and cellulose acetate butyrate. The various cellulose esters can be prepared with differing solubility depending on the number of hydroxyl groups present. Various cellulose esters are commercially available from Eastman (Kingsport, Tenn., USA). In some embodiments, the cellulose ester is not cellulose acetate.

In yet other embodiments, the polymeric material is a polyvinyl chloride (PVC) resin. The vinyl chloride can be a polymerized to form a homopolymer or copolymer. Suitable co-monomers for formation of copolymers include, for example, ethylenically unsaturated olefins such as those having 2 to 10 carbon atoms or 2 to 6 carbon atoms (e.g., ethylene and propylene), vinyl esters of carboxylic acids such as carboxylic acids having 2 to 10 carbon atoms or 2 to 6 carbon atoms or 2 to 4 carbon atoms (e.g., vinyl acetate, vinyl proprionate, and 2-ethylhexanoic acid vinyl ester), vinyl halides (e.g., vinyl fluoride, vinylidene fluoride, and vinylidene chloride), vinyl ethers (e.g., vinyl methyl ether and vinyl butyl ether), vinyl pyridine, and unsaturated acids (e.g., maleic acid, fumaric acid).

PVC resins often contain at least 50 weight percent vinyl chloride units (i.e., the residue of the vinyl chloride monomer present in the polymeric material). For example, the polyvinyl chloride resin contains at least 60 weight percent, at least 70 weight percent, at least 80 weight percent, at least 90 weight percent, at least 95 weight percent, or at least 98 weight percent vinyl chloride residue.

PVC resins are commercially available under the trade designation OXYVINYLS from OxyChem (Dallas, Tex., USA), under the trade designation FORMOLON from Formosa Plastics (Livingston, N.J., USA), or under the trade designation GEON from PolyOne (Avon Lake, Ohio, USA).

In still another embodiment, the thermoplastic polymeric material is poly(methyl methacrylate) (PMMA) or a copolymer thereof. Copolymers are prepared from a mixture of methyl methacrylate and various optional monomers such as various alkyl (meth)acrylates and (meth)acrylic acid. PMMA is commercially available from under the trade designation ELVACITE from Lucite International (Memphis, Tenn., USA) and under the trade designation PLEXIGLAS from Arkema (Bristol, Pa., USA).

The compositions can be used to provide an adhesive composition. In such compositions, the polymeric material is an elastomeric material. The elastomeric material is often an acrylic polymer such as, for example, one formed using one or more alkyl (meth)acrylate monomers. The acrylic polymer is often a copolymer that if formed from one or more alkyl (meth)acrylate monomers and at least one polar monomer such as, for example, (meth)acrylic acid, hydroxy-substituted alkyl (meth)acrylate monomers, or mixtures thereof.

Any suitable molecular weight can be used for the polymeric material that is combined with the compound of Formula (I). The weight average molecular weight is often at least 1,000 grams/mole, at least 10,000 grams/mole, at least 20,000 grams/mole, at least 50,000 grams/mole, at least 100,000 grams/mole, or at least 200,000 grams/mole. The weight average molecular weight can be up to 1 million grams/mole, up to 800,000 grams/mole, up to 600,000 grams/mole, up to 400,000 grams/mole. For example, the polymeric material can have a weight average molecular weight in a range of 10,000 grams/mole to 1 million grams/mole, in a range of 20,000 grams/mole to 600,000 grams/mole, in a range of 50,000 grams/mole to 500,000 grams/mole, or in a range of 10,000 grams/mole to 100,000 grams/mole.

The compounds of Formula (I) (or the compounds of both Formula (I) and Formula (II)) can function as a plasticizer for the polymeric material. A plasticizer is often added to a polymeric material to make the polymeric material more flexible, softer, and more workable (i.e., easier to process). More specifically, the mixture resulting from the addition of the plasticizer to the polymeric material typically has a lower glass transition temperature compared to the polymeric material alone. The glass transition temperature of a polymeric material can be lowered, for example, by at least 30° C., at least 40° C., at least 50° C., at least 60° C., or at least 70° C. by the addition of one or more compounds of Formula (I) (or by a mixture of the compounds of both Formula (I) and Formula (II)). The temperature change (i.e., decrease) tends to correlate with the amount of plasticizer added to the polymeric material. It is the lowering of the glass transition temperature that usually leads to the increased flexibility, increased elongation, and increased workability.

The plasticizers of Formula (I) (or the compounds of both Formula (I) and Formula (II)) are typically liquids at room temperature (e.g., 20° C. to 25° C.). Being a liquid at room temperature allows easy mixing of the plasticizer with the polymeric material during processing. For example, the plasticizers can be pumped into an extruder for blending with the polymeric material. The plasticizers typically do not chemically react with the polymeric material.

Further, the plasticizers of Formula (I) tend to have a low odor due to the low volatility of these compounds. The volatility can be characterized by Thermogravimetric Analysis. When heated to 200° C., the weight loss of the plasticizers of Formula (I) is less than 40 weight percent, less than 30 weight percent, less than 25 weight percent, less than 20 weight percent, or less than 10 weight percent.

The polymeric compositions that include at least 1 weight percent plasticizer based on the combined weight of the plasticizer (the compound of Formula (I) or a mixture of the compounds of Formula (I) and Formula (II)) and the polymeric material. If the polymeric composition contains less than 1 weight percent or less than 5 weight percent plasticizer, the effect of its addition may not be detected. For example, there may be no change or only a very small change in the glass transition temperature. The polymeric composition can include, for example, at least 5 weight percent, at least 10 weight percent, at least 15 weight percent, at least 20 weight percent, or at least 25 weight percent plasticizer. The amount of plasticizer in the polymeric composition can be up to 75 weight percent based on the combined weight of plasticizer and polymeric material. The upper limit is often determined by the compatibility of the plasticizer with the polymeric material. Some example compositions can include up to 70 weight percent, up to 65 weight percent, up to 60 weight percent, up to 55 weight percent, up to 50 weight percent, up to 45 weight percent, up to 40 weight percent, up to 35 weight percent, up to 30 weight percent, or up to 25 weight percent plasticizer.

Compositions with a thermoplastic polymeric material can contain 1 to 75 weight percent plasticizer (the compound of Formula (I) or a mixture of the compounds of Formula (I) and Formula (II)) and 25 to 99 weight percent polymeric materials based on a combined weight of the plasticizer and polymeric material. Some example compositions contain 5 to 75 weight percent plasticizer and 25 to 95 weight percent polymeric material, 5 to 70 weight percent plasticizer and 30 to 95 weight percent polymeric material, 5 to 60 weight percent plasticizer and 40 to 95 weight percent polymeric material, 5 to 50 weight percent plasticizer and 50 to 95 weight percent polymeric material, 5 to 45 weight percent plasticizer and 55 to 95 weight percent polymeric material, 5 to 40 weight percent plasticizer and 60 to 95 weight percent polymeric material, 5 to 30 weight percent plasticizer and 70 to 95 weight percent polymeric material, or 5 to 20 weight percent plasticizer and 80 to 95 weight percent polymeric material.

Compositions with an elastomeric polymeric material for use as an adhesive can contain 70 to 99 weight percent polymeric material and 1 to 30 weight percent plasticizer (the compound of Formula (I) or a mixture of the compounds of Formula (I) and Formula (II)) based on a combined weight of the plasticizer and polymeric material. Some example compositions contain 75 to 99 weight percent polymeric material and 1 to 25 weight percent plasticizer, 80 to 99 weight percent polymeric material and 1 to 20 weight percent plasticizer, or 80 to 95 weight percent polymeric material and 5 to 20 weight percent plasticizer.

Any other optional components can be added to the compositions. Such optional components include, but are not limited to, anti-blocking agents, anti-slip agents, fillers, nucleating agents, thermal stabilizers, light stabilizers, lubricants, pigments, colorants, anti-oxidants, anti-static agents, flame retardants, melt strength enhancers, impact modifiers, and the like. The use of any of these additional optional components may be desirable to provide compositions for specific applications.

Additionally, the plasticizers of Formula (I) (or the plasticizers of both Formula (I) and Formula (II)) can be used in combination with one or more other types of plasticizers such as those that are petroleum-based (i.e., plasticizers that are not based on renewable materials). Some example plasticizers include various phthalate esters such as diethyl phthalate, diisobutyl phthalate, dibutyl phthalate, diisoheptyl phthalate, dioctyl phthalate, diisooctyl phthalate, dinonyl phthalate, diisononyl phthalate, diisodecyl phthalate, and benzylbutyl phthalate; various adipate esters such as di-2-ethylhexyl adipate, dioctyl adipate, diisononyl adipate, and diisodecyl adipate; various phosphate esters such as tri-2-ethylhexyl phosphate, 2-ethylhexyl diphenyl phosphate, trioctylphosphate, and tricresyl phosphate; various trimettitate esters such as tris-2-ethylhexyl trimettilate and trioctyl trimettilate; various sebacate and azelate esters; and various sulfonate esters. Other example plasticizers include polyester plasticizers that can be formed by a condensation reaction of propanediols or butanediols with adipic acid.

When combined with other plasticizers, the compounds of Formula (I) are at least 50 weight percent of the total plasticizers present in the polymeric composition. The amount of the compound of Formula (I) is typically at least 60 weight percent, at least 70 weight percent, at least 80 weight percent, at least 90 weight percent, at least 95 weight percent, or at least 99 weight percent of the total plasticizers present in the polymeric composition. The amount of the compound of Formula (II) it typically no greater than 25 weight percent, no greater than 20 weight percent, no greater than 15 weight percent, no greater than 10 weight percent, or no greater than 5 weight percent of the total plasticizers present in the polymeric composition. The amount of other plasticizers not of Formula (I) or Formula (II) is typically no greater than 25 weight percent, no greater than 20 weight percent, no greater than 15 weight percent, no greater than 10 weight percent, or no greater than 5 weight percent of the total plasticizers present in the polymeric composition.

Any suitable method of mixing the polymeric material and the plasticizer can be used such as dry mixing, melt mixing, or mixing in the presence of a suitable solvent (e.g., a solvent that dissolves both the polymeric material and the plasticizer). The mixing can be performed using, for example, a melt extruder, a kneader extruder, a roll mill, a high shear mixer, a twin-screw compounder, or any other processing equipment known in the art. The conditions needed for the mixing are typically well known by those of skill in the art.

In one example mixing method, the polymeric material and the plasticizer can be mixed in a predetermined weight ratio and then melt extruded. In another example, the polymeric material and the plasticizer are mixed in a predetermined weight ratio and then formed into pellets. The pellets can be used in molding and/or extrusion processing methods to prepare a variety of articles.

Any suitable article can be formed from the mixture. Some example articles are molded objects prepared by processes such as injection molding, compression molding, or the like. Other example articles are fibers formed by spinning methods (e.g., melt spinning) or extrusion. Still other example articles are films prepared by casting from a solvent-containing mixture, by melt compression, by melt extrusion, or the like.

Some of the articles are adhesive articles. Stated differently, the compositions described herein can be adhesive compositions. The adhesive composition can be applied to a surface by melting the adhesive composition into a fluid state. For example, an adhesive layer can be formed on a substrate such as a tape backing by melt extrusion methods.

Extrusion methods tend to cause at least some alignment of the polymeric materials in the composition. This can lead to enhanced modulus from compositions that are extruded rather than solvent cast or compression molded. The modulus can be further enhanced by stretching in the machine direction. Stretching tends to cause further alignment of the polymeric material.

Polymeric films prepared from the compositions can have any desired thickness. The films are often visually clear. The can have a haze less than 5 percent, a transmittance equal to at least 90 percent, and a clarity equal to at least 90 percent using the Test Method 2 (Measurement of Haze) described in the Example section. The haze of such film samples is often less than 5 percent, less than 4 percent, less than 3 percent, or less than 2 weight percent. The transmittance and clarity are both often at least 92 percent, at least 94 percent at least 95 percent, at least 96 percent, at least 98 percent, or at least 99 percent. Low haze (e.g., less than 5 percent), high transmittance (e.g., greater than 90 percent), and high clarity (e.g., greater than 90 percent) are typically indicative of good compatibility between the polymeric material and the plasticizer (i.e., the compound of Formula (I)).

Some articles are prepared using a polymeric material that is a plant-based, that is a biodegradable, or both. For example, the polymeric material that is combined with the plasticizer can be a cellulose-based material or a poly(lactic acid)-based material. Such compositions are often desired because both the plasticizer and the polymeric material can be obtained from plant rather than petroleum resources. Stated differently, these compositions can be considered to be environmentally friendly and can be derived from renewable resources.

Various embodiments are provided that are polymeric compositions and articles.

Embodiment 1 is a polymeric composition comprising (a) a compound of Formula (I)

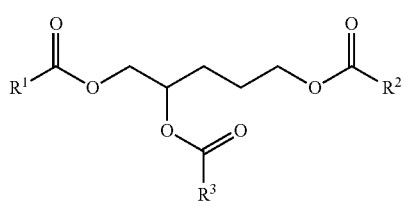

and (b) a polymeric material compatible with the compound of Formula (I). In Formula (I), each $R^1$, $R^2$, and $R^3$ is independently an alkyl group with at least two of the $R^1$, $R^2$, and $R^3$ groups having more than one carbon atom.

Embodiment 2 is the polymeric composition of embodiment 1, wherein at least two of $R^1$, $R^2$, and $R^3$ is an alkyl group having 2 to 12 carbon atoms and wherein at one of $R^1$, $R^2$, and $R^3$ is methyl.

Embodiment 3 is the polymeric composition of embodiment 1, wherein each $R^1$, $R^2$, and $R^3$ is independently an alkyl group having 2 to 12 carbon atoms.

Embodiment 4 is the polymeric composition of any one of embodiments 1 to 3, wherein the compound of Formula (I) is a liquid at room temperature.

Embodiment 5 is the polymeric composition of any one of embodiments 1 to 4, wherein the polymeric material comprises a thermoplastic polymer.

Embodiment 6 is the polymeric composition of any one of embodiments 1 to 4, wherein the polymeric material comprises an elastomer.

Embodiment 7 is the polymeric composition of any one of embodiment 1 to 6, wherein the polymeric material comprises an aliphatic polyester, a cellulose ester, a polyvinyl chloride, or an acrylic polymer.

Embodiment 8 is the polymeric composition of any one of embodiments 1 to 6, wherein the polymeric material comprising an aliphatic polyester, polyvinyl chloride, or an acrylic polymer.

Embodiment 9 is the polymeric composition of any one of embodiments 1 to 6, wherein the polymeric material is a cellulose ester not equal to cellulose acetate.

Embodiment 10 is the polymeric composition of embodiment 7 or 8, wherein the aliphatic polyester is polylactic acid.

Embodiment 11 is the polymeric composition of any one of embodiments 1 to 10, further comprising one or more compounds of Formula (II)

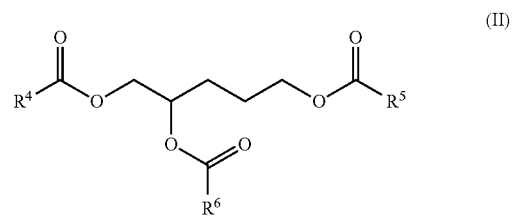

wherein each $R^4$, $R^5$, and $R^6$ independently is an alkyl and wherein at least two of $R^4$, $R^5$, and $R^6$ is methyl.

Embodiment 12 is the polymeric composition of any one of embodiments 1 to 10, wherein the polymeric composition comprises 5 to 75 weight percent compound of Formula (I) and 25 to 95 weight percent polymeric material.

Embodiment 13 is the polymeric composition of embodiment 11, wherein the polymeric composition comprises 25 to 95 weight percent polymeric material and 5 to 75 weight percent of a combination of the compound of Formula (I) and the compound of Formula (II).

Embodiment 14 is the polymeric composition of embodiment 11, wherein the amount of 1,2,5-pentane triol triacetate is no greater than 15 weight percent of the total weight of the combination of the compound of Formula (I) and the compound of Formula (II).

Embodiment 15 is the polymeric composition of embodiment 11, wherein the amount of Formula (II) is no greater than 25 weight percent of the total weight of the combination of the compound of Formula (I) and the compound of Formula (II).

Embodiment 16 is an article comprising the polymeric composition of any one of embodiments 1 to 15.

Embodiment 17 is the article of embodiment 16, wherein the article is a film or fiber.

EXAMPLES

As used in the examples, all weights and percentages are by weight unless otherwise specified.

Materials

| Name | Supplier |
|---|---|
| Acetic anhydride | Mallinkrodt Baker (Phillipsburgh, NJ, USA) |
| Propionic anhydride | Matheson, Coleman, and Bell (Norwood, OH, USA) |
| Butyric anhydride | Aldrich Chemicals (Milwaukee, WI, USA) |
| Hexanoic anhydride | Aldrich Chemical (Milwaukee, WI, USA) |
| Zinc Chloride (anhydrous) | Alfa Aesar (Ward Hill, MA, USA) |
| Tetrahydrofurfuryl alcohol | EMD Chemicals (Gibbstown, NJ, USA) |
| Acetone | VWR (West Chester, PA, USA, USA) |

TEST METHODS

Test Method 1A: Differential Scanning Calorimeter (DSC) Analysis of Films

The specimens were prepared for thermal analysis by weighing and loading the material into TA Instruments aluminum DSC sample pans (Thermal Analysis T080715). The specimens were analyzed using a Modulated Differential Scanning calorimeter (MDSC) (TA Instruments Q2000 (SN#130, Cell RC-03761), New Castle, Del., USA) utilizing a heat-cool-heat profile in temperature modulated mode (−40° C. to 185° C. at 5° C./min with a modulation amplitude of ±0.796° C. and a period of 60 seconds). The midpoint (half height) was recorded for the second heat profile.

Test Method 1B: Differential Scanning Calorimeter (DSC) Analysis of Films

Approximately 5 to 7 milligrams of a given polymer film was placed in an individual standard aluminum DSC pan (Thermal Analysis T080715), which was then placed in the auto sampler of a dynamic scanning calorimeter (Q2000 DSC, TA Instruments, New Castle, Del., USA). For each sample analysis, the pan was individually placed on one of the differential posts in the DSC's enclosed cell along with an empty reference pan on the opposite post. The samples were subjected to a heat-cool-heat profile over a temperature range of −80° C. to 250° C. at 10° C./min. The midpoint (half height) was recorded for the second heat profile.

Test Method 2: Haze

The haze was measured using an Ultrascan Pro Spectrophotometer (Hunter Associates Laboratory, Reston, Va., USA). The instrument was standardized with a diffuse/8° white tile instrument standard (Hunter Associates Laboratory). The film sample was then placed flush with the transmission port on the inside of the instrument. A measurement was taken with a white tile standard followed by a light trap (Hunter Associates Laboratory) on the outside of the unit, and the percent haze was recorded. The measurement was repeated at three different locations on each film sample. The percent haze value result was then calculated as an average of the three measurements.

Test Method 3: Film Weight Loss

Films were pressed between polyester (PET) films by using 3.5 g of the polymer resin with 2.5 mm shims in a hot press (Carver 2699, Carver Inc., USA) with a clamp force of 6000 pounds at 200° C. A sample of approximately 1.5 grams was placed in an aluminum pan. The sample was placed in an oven at 100° C. and the weight was recorded after 3.5 and 24 hours.

Test Method 4: Thermo-gravimetric Analysis (TGA) of Plasticizers

The weight loss of the 1,2,5-pentanetriol trialkanoates was measured by TGA. Approximately 17-25 milligrams of a sample was placed in a standard aluminum pan and heated to 500° C. at a rate of 10° C./min using a Model TGA 2950, which is commercially available from TA Instruments (New Castle, Del., USA). The weight loss of each sample was determined at 200° C. and 250° C.

Test Method 5: Gas Chromatographic (GC) Analysis

Approximately 30 milligrams (mg) of plasticizer was placed into a vial and diluted with 1 mL of ethyl acetate. The sample was analyzed according to the following conditions.

GC Instrument: Agilent 6890 Series (Agilent Technologies, Santa Clara, Calif., USA)

Column: HP-1; 30 meters by 0.32 millimeter by 0.25 micrometer

Program: Heat from 50° C. to 250° C. at 10° C./min; hold for 10 minutes at 250° C.

Gas Phase: Helium, 50 centimeters/second

Injection: 1 microliter, splitless

The GC peak areas ratios were determined to calculate the relative amounts of tri-ester products in the samples.

Test Method 6: Tensile and Elongation

An Instron Model 4500 Universal Testing system (Norwood, Mass.) with a 1 kN load cell was used for all tensile and elongation testing. Testing was performed at a rate of 300 mm/minute (11.81 inches/minute) for a total distance of 250 mm (9.84 inches). Samples were tested at least 24 hours after being prepared. A 1.27 cm (0.5 inch) wide strip of film was cut and the thickness was determined for each sample using a micrometer. Typical initial sample length is 5-7 cm (2-3 inches). The peak force was divided by the cross-sectional area in order to determine the tensile strength. The distance traveled at break was used to determine the elongation by dividing by the initial length. Three replicates of each sample were tested and the reported values are an average of the three samples.

Preparatory Examples 1-4

A mixture of alkyl anhydride (see Table 1 for the specific alkyl anhydride used) and anhydrous zinc chloride was heated to 130° C. Tetrahydrofurfuryl alcohol (THF-alcohol, Alfa Aesar) was added dropwise over 30 minutes (see Table 1 for amounts). The mixture was heated at 140° C. for 20 hours, cooled, and filtered. The filtrate was distilled under reduced pressure. Excess alkyl anhydride was removed first by distillation (at a vacuum of 1.0 to 5.0 mm Hg). The residue was then distilled at a lower pressure (0.2 to 0.3 mmHg) to give the product as a colorless or yellow oil.

The product names are as follows: 1,2,5-pentane triol triacetate for Preparatory Example 1, 1,2,5-pentane triol tripropionate for Preparatory Example 2, 1,2,5-pentane triol tributyrate for Preparatory Example 3, and 1,2,5-pentane triol trihexanoate for Preparatory Example 4.

TABLE 1

Preparation of 1,2,5-pentanetriol trialkanoates

| Preparatory Example | Alkyl Anhydride | Anhydride, grams | Zinc Chloride, grams | THF-Alcohol, grams | Product boiling point | Yield, grams |
|---|---|---|---|---|---|---|
| 1 | acetic | 406.08 | 8.14 | 102.09 | 111-121° C. at 0.26 mm Hg | 174.36 |

TABLE 1-continued

Preparation of 1,2,5-pentanetriol trialkanoates

| Preparatory Example | Alkyl Anhydride | Anhydride, grams | Zinc Chloride, grams | THF-Alcohol, grams | Product boiling point | Yield, grams |
|---|---|---|---|---|---|---|
| 2 | propionic | 362.34 | 5.73 | 71.09 | 125-126° C. at 0.30 mm Hg | 136.96 |
| 3 | butyric | 300.00 | 3.93 | 48.90 | 160-165° C. at 0.15 mm Hg | 66.53 |
| 4 | hexanoic | 144.09 | 1.37 | 17.17 | 180-182° C. at 0.20 mm Hg | 5.62 |

Preparatory Example 5

A mixture of acetic anhydride (30.02 grams, 0.29 moles), propionic anhydride (114.72 grams, 0.88 moles), and anhydrous zinc chloride (2.40 grams) was heated to 50° C. Tetrahydrofurfuryl alcohol (30.00 grams, 0.29 moles) was added dropwise over 5 minutes. The mixture was heated at 140° C. for 20 hours, cooled, and filtered. The filtrate was distilled under reduced pressure. Excess alkyl anhydride was removed first by distillation (at a vacuum of 1.0 to 5.0 mm Hg). The residue was then distilled at a 115° C. to 124° C. at 0.3 mmHg to give the product as a colorless oil (69.02 grams).

The relative amounts (percentage by peak area of the tri-esters) of the products formed from Preparatory Example 5 were determined using gas chromatography (Test Method 5) and is shown in Table 2.

TABLE 2

Relative amounts of products formed for Preparatory Example 5

| Prep Example | 1,2,5-pentane triol triacetate, % peak area | 1,2,5-pentane triol diacetate-monopropionate, % peak area | 1,2,5-pentane triol monoacetate-dipropionate, % peak area | 1,2,5-pentane triol tripropionate, % peak area |
|---|---|---|---|---|
| 5 | 1.7 | 16.1 | 44.3 | 37.9 |

Preparatory Example 6

A mixture of acetic anhydride (19.99 grams, 0.20 moles), butyric anhydride (93.11 grams, 0.59 moles), and anhydrous zinc chloride (1.60 grams) was heated to 50° C. Tetrahydrofurfuryl alcohol (20.00 grams, 0.20 moles) was added dropwise over 5 minutes. The mixture was heated at 140° C. for 20 hours, cooled, and filtered. The filtrate was distilled under reduced pressure. Excess alkyl anhydride was removed first by distillation (at a vacuum of 1.0 to 5.0 mm Hg). The residue was then distilled at a 130° C. to 150° C. at 0.25 mm Hg to give the product as a yellow oil (43.05 grams).

The relative amounts (percentage by peak area of the tri-esters) of the products formed from Preparatory Example 6 were determined using gas chromatography (Test Method 5) and are shown in Table 3.

TABLE 3

Relative amounts of products formed for Preparatory Example 6

| Preparatory Example | 1,2,5-pentane triol triacetate, % peak area | 1,2,5-pentane triol diacetate-monobutyrate, % peak area | 1,2,5-pentane triol monoacetate-dibutyrate, % peak area | 1,2,5-pentane triol tributyrate, % peak area |
|---|---|---|---|---|
| 6 | 1.1 | 14.4 | 44.5 | 39.9 |

Thermogravimetric Analysis of 1,2,5-Pentanetriol Trialkanoates

Test method 4 was used to analyze Preparatory Examples 1-6.

TABLE 4

Thermogravimetric analysis of 1,2,5-pentanetriol trialkanoates.

| Preparatory Example | Weight loss at 200° C., wt % | Weight Loss at 250° C., wt % |
|---|---|---|
| 1 | 49.0 | 100 |
| 2 | 38.0 | 100 |
| 3 | 21.8 | 96.8 |
| 4 | 16.4 | 52.4 |
| 5 | 29.1 | 99.9 |
| 6 | 27.5 | 99.6 |

Examples 1-4 and Comparative Examples C1-C3

Plasticized Cellulose Acetate Films

Cellulose acetate (CA 398-30, Eastman Chemical Company, Kingsport Tenn., USA) was dissolved in acetone at 24.6 weight percent solids. The 1,2,5-pentanetriol trialkanoate was added with additional acetone (the amounts are shown in Table 5). Cellulose acetate films were prepared by a coating the coating each solution onto a carrier film (PET film) using a #14 meyer rod. The casted film was allowed to dry for 1 hour at room temperature and was removed from the carrier film to give a film thickness of 0.02 to 0.03 mm. Haze and glass transition temperature of the films were determined according to Test Methods 1A and 2.

TABLE 5

Plasticized cellulose acetate films

| Ex | Cellulose acetate solution, grams | Prep Ex | Prep Ex, grams | Acetone, grams | Plasticizer in CA, wt % | Film Thickness, mm | Haze, % | Tg, ° C. |
|---|---|---|---|---|---|---|---|---|
| C1 | | none | | | 0 | 0.03 | 0.5 | 193 |
| C2 | 8.20 | 1 | 0.36 | 4.00 | 15.1 | 0.03 | 0.7 | 124 |

TABLE 5-continued

Plasticized cellulose acetate films

| Ex | Cellulose acetate solution, grams | Prep Ex | Prep Ex, grams | Acetone, grams | Plasticizer in CA, wt % | Film Thickness, mm | Haze, % | Tg, °C. |
|---|---|---|---|---|---|---|---|---|
| C3 | 8.54 | 1 | 0.23 | 4.20 | 9.9 | 0.02 | 1.1 | 142 |
| 1 | 6.62 | 2 | 0.29 | 3.60 | 15.1 | 0.02 | 1.3 | 128 |
| 2 | 6.76 | 2 | 0.19 | 3.80 | 10.3 | 0.03 | 2.0 | 140 |
| 3 | 10.24 | 3 | 0.43 | 5.92 | 14.6 | 0.03 | 1.0 | 154 |
| 4 | 11.32 | 4 | 0.49 | 6.31 | 15.0 | 0.03 | 5.2 | 135/154* |

*Two Tg's observed

Examples 5-8 and Comparative Examples C4-05

Plasticized PLA Films

Mixtures of polylactic acid (PLA 4032D, Natureworks, LLC, Minnetonka, Minn.) and 1,2,5-pentanetriol trialkanoate plasticizers were compounded in a Brabender ATR Plasti-Corder (C.W. Brabender Instruments Co., Hackensack, N.J., USA) at a temperature of 200° C. with a mixing speed of 100 revolutions per minute. The resulting resin was then tested for glass transition temperature using Test Method 1B.

Films were pressed between polyester (PET) films by using 3.5 grams of the polymer resin with 0.254 mm shims in a hot press (Carver 2699, Carver Inc., USA) with a clamp force of 6000 pounds at 200° C. to give a final film thickness of 0.24 to 0.27 mm.

Haze and glass transition temperature of the films were determined according to Test Methods 1B and 2. The weight loss of the samples after heat aging was determined according to Test Method 3. The tensile strength and elongation were determined according to Test Method 6.

TABLE 6

Plasticized PLA (4032) films

| Example | Plasticizer | Plasticizer amount, wt % | Haze, % | Tg, °C. | Tensile Strength, MPa | Elongation, % | Weight Loss at 100° C., wt % | |
|---|---|---|---|---|---|---|---|---|
| | | | | | | | 3.5 hr | 24 hr |
| C4 | none | 0 | 2.9 | 63 | 35 | 3 | | |
| C5 | Preparatory Example 1 | 20 | 3.4 | 50 | 22 | 135 | 2.54 | 6.43 |
| 5 | Preparatory Example 2 | 20 | 2.0 | 41 | 16 | 115 | 2.14 | 5.62 |
| 6 | Preparatory Example 3 | 20 | 2.3 | NA | 18 | 144 | 0.69 | 2.47 |
| 7 | Preparatory Example 5 | 20 | 2.1 | NA | 26 | 237 | 1.95 | 5.60 |
| 8 | Preparatory Example 6 | 20 | 2.4 | NA | 26 | 248 | 1.12 | 3.90 |

NA: No observable Tg

Examples 9-18 and Comparative Example C6-C8

Plasticized PVC Films

Mixtures of PVC (Poly(vinyl chloride)) resin with a weight average molecular weight of about 62,000 grams/mole (obtained from Aldrich Chemical (Milwaukee, Wis., USA) as product number 18958-8), plasticizer, and tetrahydrofuran in amounts shown in Table 6 were shaken for 12 hours at room temperature. Approximately 5.0 grams of each solution was poured into an aluminum pan and dried at room temperature for 24 hours. Comparative Example C3 contained only PVC (no plasticizer was added). All samples were transparent films. The glass transition temperature of each sample was determined according to Test Method 1B and is shown in Table 7.

TABLE 7

Plasticized PVC films

| Example | Plasticizer | Plasticizer, grams | PVC, grams | THF, grams | Tg,° C. |
|---|---|---|---|---|---|
| C6 | none | | | | 81.0 |
| C7 | Prep example 1 | 1.00 | 4.00 | 20.00 | 5.96 |
| C8 | Prep example 1 | 0.51 | 4.50 | 19.99 | 19.1 |
| 9 | Prep example 2 | 1.00 | 4.01 | 20.00 | 7.7 |
| 10 | Prep example 2 | 0.51 | 4.50 | 20.21 | 18.5 |
| 11 | Prep example 3 | 1.00 | 4.01 | 19.99 | 9.8 |
| 12 | Prep example 3 | 0.50 | 4.51 | 20.02 | 22.1 |
| 13 | Prep example 4 | 1.00 | 4.01 | 19.98 | 8.1 |
| 14 | Prep example 4 | 0.50 | 4.50 | 20.03 | 24.4 |
| 15 | Prep example 5 | 1.00 | 4.00 | 20.06 | 14.5 |
| 16 | Prep example 5 | 0.50 | 4.50 | 20.00 | 27.6 |
| 17 | Prep example 6 | 1.00 | 4.00 | 20.01 | 15.8 |
| 18 | Prep example 6 | 0.51 | 4.50 | 20.00 | 25.6 |

What is claimed is:

1. A polymeric composition comprising:
   a) a plurality of different 1,2,5-pentanetriol trialkyl ester compounds wherein each alkyl group has 1 to 12 carbon atoms; and
   b) a polymeric material compatible with the plurality of different 1,2,5-pentanetriol trialkyl ester compounds.

2. The polymeric composition of claim 1, wherein the polymeric composition comprises at least one 1,2,5-pentanetriol trialkyl ester having alkyl groups that are not all the same.

3. The polymeric composition of claim 1, wherein the plurality of different 1,2,5-pentanetriol trialkyl ester compounds comprises a reaction product of tetrahydrofurfuryl alcohol and two different anhydrides of formula

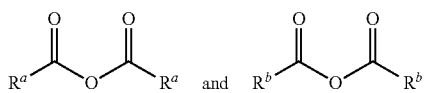

wherein $R^a$ and $R^b$ are alkyl groups having 1 to 12 carbon atoms.

4. The polymeric composition of claim 1, wherein the plurality of different 1,2,5-pentanetriol trialkyl ester compounds comprises a compound of Formula (I)

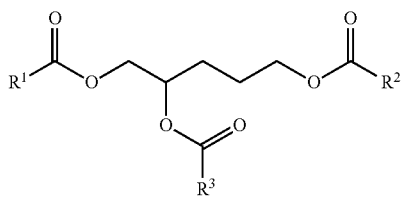

wherein each $R^1$, $R^2$, and $R^3$ is independently an alkyl group with at least two of the $R^1$, $R^2$, and $R^3$ groups having 2 to 12 carbon atoms.

5. The polymeric composition of claim 4, wherein at least two of $R^1$, $R^2$, and $R^3$ is an alkyl group having 2 to 12 carbon atoms and wherein at least one of $R^1$, $R^2$, and $R^3$ is methyl.

6. The polymeric composition of claim 4, wherein each $R^1$, $R^2$, and $R^3$ is independently an alkyl group having 2 to 12 carbon atoms.

7. The polymeric composition of claim 4, wherein the compound of Formula (I) is a liquid at room temperature.

8. The polymeric composition of claim 1, wherein the polymeric material comprises a thermoplastic polymer.

9. The polymeric composition of claim 1, wherein the polymeric material comprises an elastomer.

10. The polymeric composition of claim 1, wherein the polymeric material comprises an aliphatic polyester, a cellulose ester, a polyvinyl chloride, or an acrylic polymer.

11. The polymeric composition of claim 1, wherein the polymeric material comprising an aliphatic polyester, polyvinyl chloride, or an acrylic polymer.

12. The polymeric composition of claim 1, wherein the polymeric material is a cellulose ester not equal to cellulose acetate.

13. The polymeric composition of claim 1, wherein the aliphatic polyester is polylactic acid.

14. The polymeric composition of claim 4, further comprising one or more compounds of Formula (II)

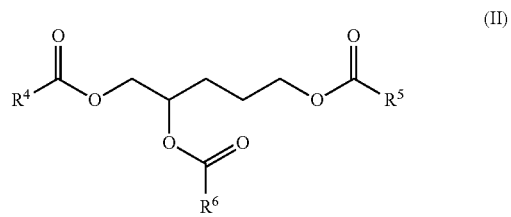

wherein each $R^4$, $R^5$, and $R^6$ independently is an alkyl and wherein at least two of $R^4$, $R^5$, and $R^6$ is methyl.

15. The polymeric composition of claim 1, wherein the polymeric composition comprises 5 to 75 weight percent compound of Formula (I) and 25 to 95 weight percent polymeric material.

16. The polymeric composition of claim 14, wherein the amount of 1,2,5-pentane triol triacetate is no greater than 25 weight percent of the total weight of the combination of the compound of Formula (I) and the compound of Formula (II).

17. An article comprising the polymeric composition of claim 1.

18. The article of claim 17, wherein the article is a film or fiber.

19. A composition comprising a plurality of different 1,2,5-pentanetriol trialkyl ester compounds wherein each alkyl group has 1 to 12 carbon atoms.

20. The composition of claim 19, wherein the composition comprises at least one 1,2,5-pentanetriol trialkyl ester having alkyl groups that are not all the same.

* * * * *

UNITED STATES PATENT AND TRADEMARK OFFICE
CERTIFICATE OF CORRECTION

| | | |
|---|---|---|
| PATENT NO. | : 9,593,230 B2 | Page 1 of 1 |
| APPLICATION NO. | : 15/025745 | |
| DATED | : March 14, 2017 | |
| INVENTOR(S) | : Kevin Lewandowski et al. | |

It is certified that error appears in the above-identified patent and that said Letters Patent is hereby corrected as shown below:

In the Specification

Column 3
Lines 58-59, delete "5-petanetriol." and insert -- 5-pentanetriol. --, therefor.
Line 59, delete "5-petanetriol" and insert -- 5-pentanetriol --, therefor.

Column 5
Line 28, delete "proprionic" and insert -- propionic --, therefor.

Column 7
Line 43, delete "tributryrate," and insert -- tributyrate, --, therefor.
Line 58, delete "proprionate," and insert -- propionate, --, therefor.

Column 10
Line 17, delete "trimettitate" and insert -- trimellitate --, therefor.
Line 18, delete "trimettilate" and insert -- trimellitate --, therefor.
Line 19, delete "trimettilate;" and insert -- trimellitate; --, therefor.

Column 13 (Table)
Line 9 (approx.), delete "Mallinkrodt" and insert -- Mallinckrodt --, therefor.
Line 9 (approx.), delete "(Phillipsburgh," and insert -- (Phillipsburg, --, therefor.
Line 27, delete "calorimeter" and insert -- Calorimeter --, therefor.

Signed and Sealed this
Thirtieth Day of May, 2017

Michelle K. Lee
*Director of the United States Patent and Trademark Office*